(12) United States Patent
Perez

(10) Patent No.: US 6,426,851 B1
(45) Date of Patent: Jul. 30, 2002

(54) FLEXURE LIMITER WITH SNAGGING FEATURE

(75) Inventor: John Perez, Moreno Valley, CA (US)

(73) Assignee: Magnecomp Corporation, Temecula, CA (US)

( * ) Notice: Subject to any disclaimer, the term of this patent is extended or adjusted under 35 U.S.C. 154(b) by 0 days.

(21) Appl. No.: 10/000,984

(22) Filed: Oct. 30, 2001

Related U.S. Application Data

(63) Continuation of application No. 09/738,601, filed on Dec. 14, 2000, now Pat. No. 6,327,118, which is a continuation of application No. 09/384,791, filed on Aug. 26, 1999, now Pat. No. 6,195,237.

(51) Int. Cl.[7] ................................................. G11B 5/60
(52) U.S. Cl. ..................................................... 360/245.7
(58) Field of Search ....................................... 360/245.7

(56) References Cited

U.S. PATENT DOCUMENTS

| 5,771,136 | A | * | 6/1998 | Girard | 360/104 |
| 6,137,657 | A | * | 10/2000 | Coon et al. | 360/245.7 |
| 6,195,237 | B1 | * | 2/2001 | Perez | 360/245.7 |
| 6,327,118 | B1 | * | 12/2001 | Perez | 360/245.7 |

* cited by examiner

Primary Examiner—Robert S. Tupper
(74) Attorney, Agent, or Firm—Louis J. Bachand

(57) ABSTRACT

The disengagement of a disk drive suspension limiter from the load beam is blocked by the provision of a tab that interfits with the load beam against separation during intended engagement.

9 Claims, 3 Drawing Sheets

FLEXURE LIMITER WITH SNAGGING FEATURE

REFERENCE TO RELATED APPLICATIONS

This application is a continuation of application Ser. No. 09/738,601 filed Dec. 14, 2000 now U.S. Pat. No. 6,327,118 which application is a continuation of application Ser. No. 09/384,791, filed Aug. 26, 1999, now U.S. Pat. No. 6,195,237.

STATEMENT REGARDING FEDERALLY SUPPORTED RESEARCH OR DEVELOPMENT

Not applicable.

REFERENCE TO A MICROFICHE APPENDIX

Not applicable.

BACKGROUND OF THE INVENTION

1. Field of the Invention

This invention has to do with disk drive suspensions, and more particularly with limiters useful to limit undue travel of the suspension in the disk drive. Specifically, the invention is concerned with improvements in limiters to better retain engagement of the limiter with the suspension.

2. Description of the Related Art

Limiters are mechanical structures that limit the travel the tongue portion of the flexure makes relative to the load beam surrounding the flexure. Limitation of movement prevents damage to the flexure and thus to the suspension. Movement limitation is need both during lift-off of the suspension from the disk and during shock events such as sharp blows to the computer affecting the disk drive. Limiters are known to be positioned at the flexure tip and at the flexure tongue tip. The present invention is concerned with improvements in the flexure tongue tip type of limiter. In practice this type of limiter, which uses a specially shaped tongue tip to overlie the adjacent load beam portion, the limiter can slip past the opposing load beam surface and disengage if the contact is less than perfect as to angle and position inward on the load beam edge margin. The movement limitation intended is then lost.

BRIEF SUMMARY OF THE INVENTION

It is an object, therefore, to provide an improved disk drive suspension. It is a further object to provide a disk drive suspension having an improved limiter feature. Yet another object is to provide a flexure tongue tip limiter of improved design against slipping and disengaging from the opposing load beam surface. It is a further object to provide a suspension limiter having cooperating tab and slot structure on opposing flexure tip and load beam surfaces to positively engage the surfaces against slippage and disengagement.

These and other objects of the invention, to become apparent hereinafter, are realized in a disk drive suspension comprising a load beam having a rigid portion and a flexure depending from the rigid portion, the flexure having a frame, a tongue cantilevered from the frame and generally spaced at a gap from the frame, and a tongue tip, the tip being movable relative to the frame, the flexure tip having a limiter comprising a continued flexure tip extent projecting out of the plane of the flexure tip and shaped to oppose the frame in frame contacting relation after a predetermined travel of the flexure, the limiter and the frame defining cooperating tab and slot structure arranged so that the limiter intersects with the surface of the frame in the contacted condition of the limiter with the frame against movement of the limiter into the gap.

In this and like embodiments, typically, the flexure tip continued extent defines a tab, the frame defining a slot shaped to receive the tab in intersecting relation, and the slot extends through the frame.

In a further embodiment, the flexure tongue tip continued extent extends normal to the flexure tongue and defines a U-shape open to the plane of the flexure, one leg of the U-shape being attached to the tongue tip, the other leg of the U-shape being parallel to the one leg and defining the tab, the other leg being sufficiently long to intersect with a slot formed in the frame upon the predetermined travel of the flexure, the slot extends through the frame, the frame portion has an edge margin adjacent the flexure tip, the slot comprising a rectangular slot in the frame edge margin, the rectangular slot has a given width, the tab being rectangular and of a lesser width than the slot, and the long axis of the tab is normal to the long axis of the slot.

BRIEF DESCRIPTION OF THE SEVERAL VIEWS OF THE DRAWINGS

The invention will be further described ads to an illustrative embodiment in conjunction with the attached drawings in which.

DETAILED DESCRIPTION OF THE INVENTION

The invention limiter offers better engagement than previous structures through the positive engagement of the tab in a slot, so that it cannot slip sideways off the opposing frame and into the gap. In addition the tab edge is, in preferred embodiments, squared off and not rounded. This increases strength at the tip and contributes to secure engagement without, however, blocking the desired up and down movement needed in the limiter.

Figure 1:
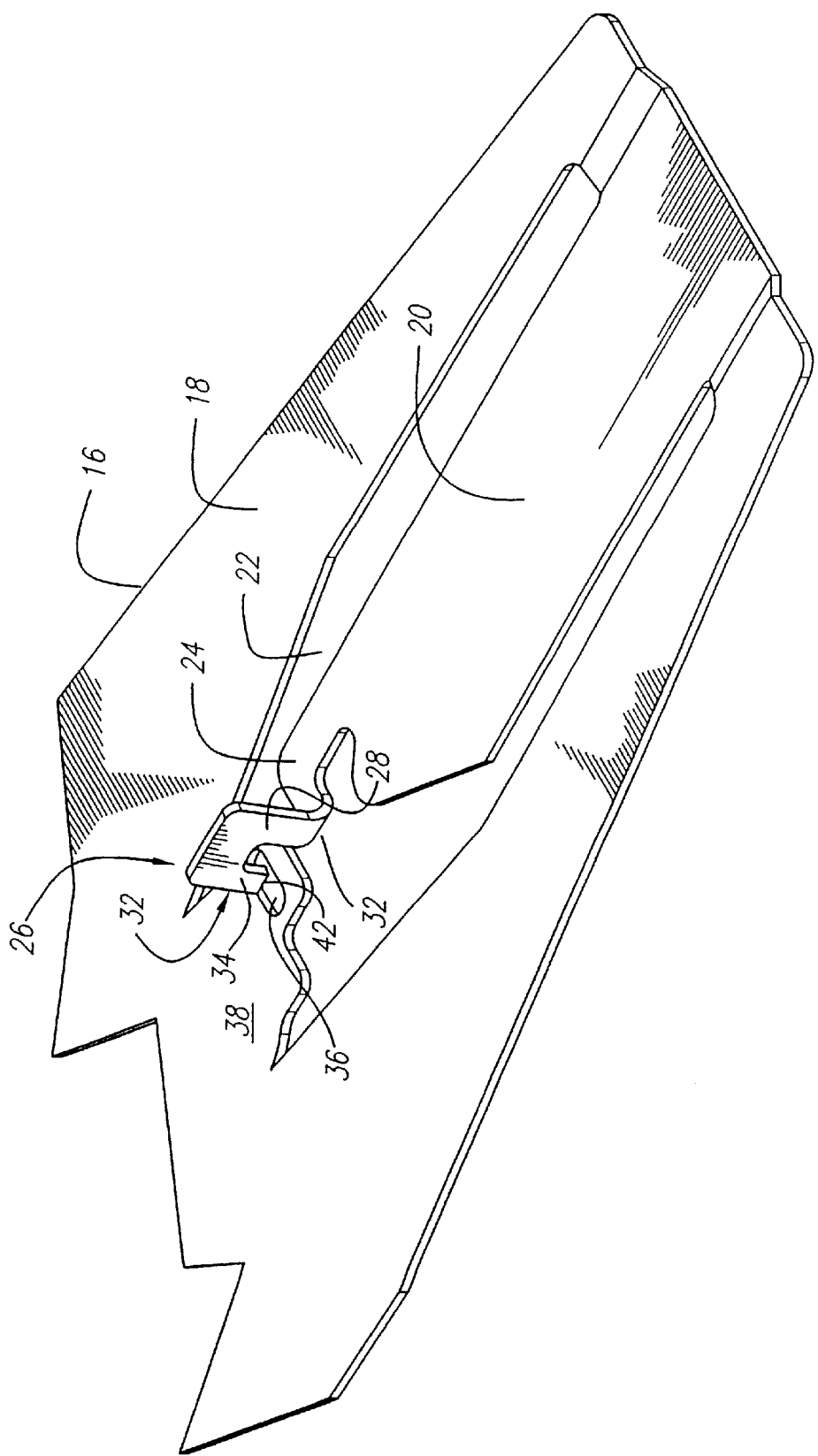
FIG. 1 is an oblique view of the flexure.
Figure 2:
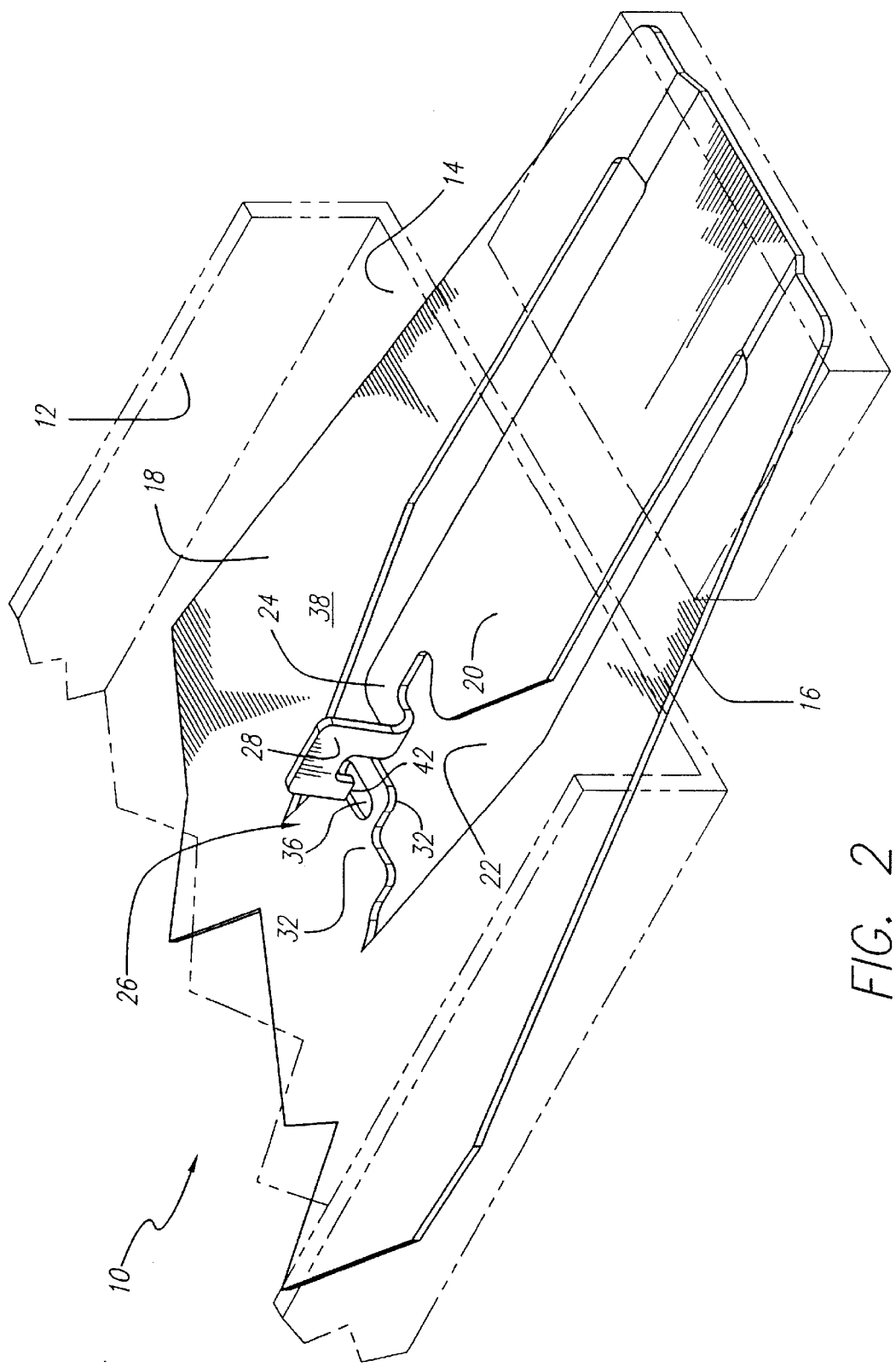
FIG. 2 is a view like FIG. 1 showing the flexure positioned on a load beam.
Figure 4:
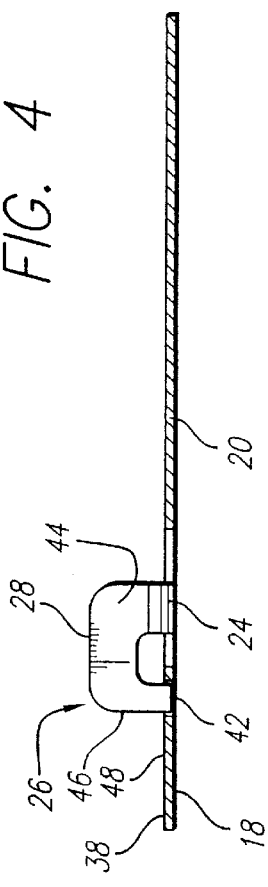
FIG. 4 is a view taken on line 4—4 of FIG. 3.
Figure 3:
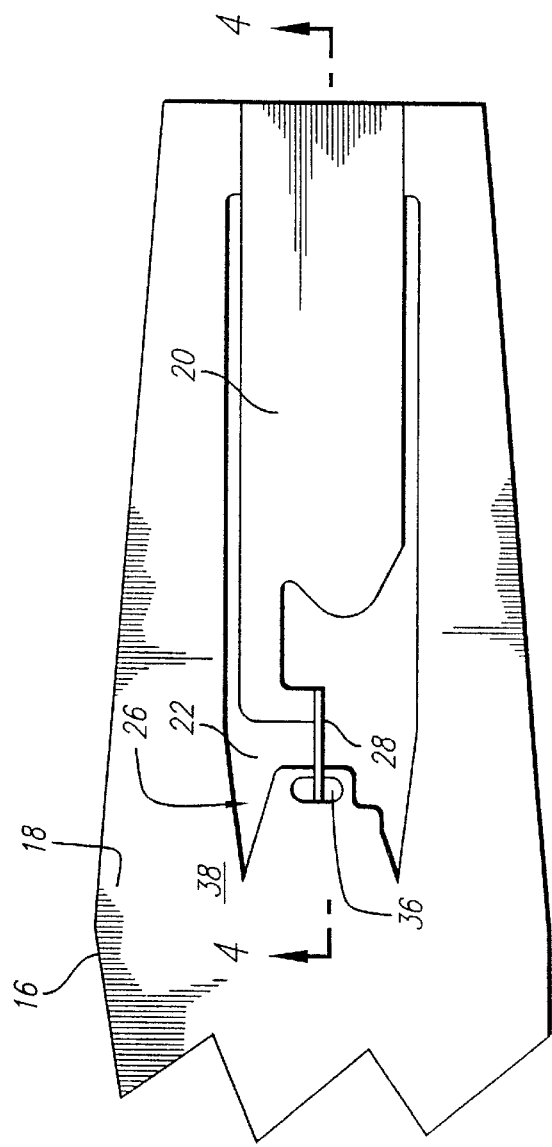
FIG. 3 is a plan view of the flexure.

With reference now to the drawings in detail, in FIGS. 1 and 2 the invention disk drive suspension at 10 comprises load beam 12 having a rigid portion 14 and a flexure 16 depending from the rigid portion. The flexure 16 has a frame 18, a tongue 20 cantilevered from the frame and generally spaced at a gap 22 from the frame. Flexure tongue 20 has a tongue tip 24. Tongue tip 24 is movable relative to the frame 18. Flexure 16 has a limiter 26 comprising a continued flexure tip extent 28 projecting out of the major plane of the flexure tip and shaped as shown to oppose the frame 18 in frame contacting relation after a predetermined travel of the flexure. The flexure tip extent 28 and the frame 18 mutually define structure 32 comprising a cooperating tab 34 and slot 36. The tab 34 and slot 36 are arranged as shown (FIGS. 1–4) so that the limiter tab 34 intersects with the surface 38 of the frame 18 in the contacted condition of the limiter 26 with the frame against movement of the limiter tab 34 into the gap 22 through nonengagement or disengagement of the tab with the frame surface 38. Through the intersection of the tab 34 and the slot 36, the squared off edge 42 of the tab enters the slot, shown to be a through slot, but the slot may be only partially through the frame 18, and blocks lateral movement of the tab beyond the slot limits, and thus keeps the limiter structure 32 engaged.

As shown, the flexure tongue tip continued extent 28 extends normal to the major plane of the flexure 16 and tongue 20 and defines a U-shape open to the plane of the flexure. One leg 44 of the U-shape is attached to the tongue tip 24; the other leg 46 of the U-shape is parallel to the leg 44 and defines the tab 34. Leg 46 is sufficiently long to intersect with the slot rectangular 36 formed in the edge margin 48 of the frame 16 upon the predetermined travel of the flexure. The rectangular slot 36 has a given width, the tab 34 is preferably rectangular and of a lesser width than the slot, and has its long axis normal to the long axis of the slot.

The invention thus provides a disk drive suspension having an improved limiter feature against slipping and disengaging from the opposing load beam surface comprising a cooperating tab and slot structure on opposing flexure tip and load beam surfaces to positively engage the surfaces against slippage and disengagement.

I claim:

1. A disk drive suspension comprising a load beam having a rigid portion and a flexure supported by said rigid portion, said flexure extending in a flexure plane, said flexure having a tongue with a tongue tip, said tongue tip having a limiter comprising a continued tongue tip extent projecting out of the plane of said tongue tip and through said flexure plane, said continued tongue tip extent being shaped and positioned to limit travel of said tongue relative to said flexure after a predetermined travel of said tongue, said flexure tongue tip continued extent intersecting with said flexure upon said predetermined travel of said tongue.

2. The disk drive suspension according to claim 1, in which said flexure tongue tip continued extent extends reversely of said tongue tip, said flexure being shaped to receive said continued extent in intersecting relation in engaged relation of said tongue tip with said flexure.

3. The disk drive suspension according to claim 2, in which said received continued extent extends through said flexure.

4. The disk drive suspension according to claim 2, in which said flexure tongue tip continued extent extends substantially normal to said flexure tongue.

5. The disk drive suspension according to claim 4, in which said received continued extent extends through said flexure, said continued extent having a square edge opposite said flexure.

6. The disk drive suspension according to claim 4, in which said flexure has an edge margin adjacent said tongue tip, said flexure edge margin defining a continued extent receiving opening.

7. The disk drive suspension according to claim 6, in which said rectangular slot has a given width, said tab being rectangular and of a lesser width than said slot.

8. The disk drive suspension according to claim 7, in which the long axis of said continued extent is normal to the plane of said edge margin.

9. A method of limiting flexure tongue movement relative to the flexure, said flexure extending in a flexure plane, including juxtaposing a tip of said tongue with an opposing portion of said flexure to engage said flexure and limit travel beyond a predetermined distance, projecting a continued extent of said tongue tip through said flexure plane, and intersecting said projecting continued extent with said flexure to block movement of said tip away from said flexure in the engaged condition of said tongue tip and flexure.

* * * * *